United States Patent
Allert et al.

(10) Patent No.: US 12,501,737 B2
(45) Date of Patent: Dec. 16, 2025

(54) PHOTOVOLTAIC DEVICE WITH AN ANTI-REFLECTIVE COATING AND ANTI-REFLECTIVE COATING FOR PHOTOVOLTAIC DEVICES

(71) Applicant: SWEDISH ALGAE FACTORY AB, Gothenburg (SE)

(72) Inventors: Sofie Allert, Torslanda (SE); Ingvar Åberg, Staffanstorp (SE)

(73) Assignee: SWEDISH ALGAE FACTORY AB, Gothenburg (SE)

( * ) Notice: Subject to any disclaimer, the term of this patent is extended or adjusted under 35 U.S.C. 154(b) by 146 days.

(21) Appl. No.: 18/553,822

(22) PCT Filed: Apr. 7, 2022

(86) PCT No.: PCT/SE2022/050351
§ 371 (c)(1),
(2) Date: Oct. 3, 2023

(87) PCT Pub. No.: WO2022/216214
PCT Pub. Date: Oct. 13, 2022

(65) Prior Publication Data
US 2024/0186428 A1 Jun. 6, 2024

(30) Foreign Application Priority Data
Apr. 9, 2021 (SE) .................... 2130098-3

(51) Int. Cl.
*H10F 77/30* (2025.01)

(52) U.S. Cl.
CPC ................ *H10F 77/315* (2025.01)

(58) Field of Classification Search
None
See application file for complete search history.

(56) References Cited

U.S. PATENT DOCUMENTS

| 8,153,282 B2 | 4/2012 | Mellott |
| 2016/0291206 A1 | 10/2016 | Van Dijck et al. |
| 2019/0106672 A1 | 4/2019 | Allert et al. |

OTHER PUBLICATIONS

Llorens J M et al, "Light Absorption Enhancement with Bio-inspired Nanostructures", ESA Final Report, (Dec. 15, 2020), pp. 1-40.

*Primary Examiner* — Eli S Mekhlin
(74) *Attorney, Agent, or Firm* — DUANE MORRIS LLP; Gregory M. Lefkowitz; Daniel J. Tarr (57) ABSTRACT

Photovoltaic device comprising an anti-reflective coating on a light incident side of a transparent cover layer, the anti-reflective coating comprising a layer of diatom frustules, each of the frustules comprising two adjacent and connected porous silica layers, the first porous silica layer having a pore diameter and pore pitch defining a first layer porosity, the second porous silicon layer having a pore diameter and pore pitch defining a second layer porosity, the second layer porosity being less than the first layer porosity, the layer of diatom frustules being arranged such that the first porous silica layer is light incident with respect to the second porous silica layer.

15 Claims, 7 Drawing Sheets

PHOTOVOLTAIC DEVICE WITH AN ANTI-REFLECTIVE COATING AND ANTI-REFLECTIVE COATING FOR PHOTOVOLTAIC DEVICES

CROSS-REFERENCE TO RELATED APPLICATIONS

This application is a § 371 national stage entry of International Application No. PCT/SE2022/050351, filed Apr. 7, 2022, which claims priority to Sweden Application No. 2130098-3, filed Apr. 9, 2021, the entire contents of which are incorporated herein by reference.

FIELD OF THE INVENTION

The present disclosure relates to photovoltaic devices and anti-reflective coatings for such devices. In particular it relates to photovoltaic devices comprising an anti-reflective layer of diatom frustules.

BACKGROUND OF THE INVENTION

Photovoltaic devices are used to convert light energy into electrical energy. Generally photovoltaic devices comprise an active layer which comprises a light absorbing material which generates a charge upon exposure to light. A variety of materials may form the active layer, such as silicon (Si), copper indium gallium diselenide (CIGS), or gallium arsenide (GaAs) and others which are known in the art.

The active layer is normally covered by an external transparent cover layer. The cover layer, generally made of glass, protects the active layer from the ambient atmosphere, from rain, the accumulation of dirt etc. As the cover layer is positioned on the light incident side of the active layer, a portion of the received light is reflected prior to being received at the active layer. This reduces the overall efficiency of the photovoltaic device. Whilst glass cover layers are common, polymer cover layers, or cover layers comprising a number of different polymers, are also known.

Anti-reflective coatings (ARCs) are known in the art to reduce the amount of light reflected from the cover plate. An example of an anti-reflective coating is provided in EP 3 071 650 B1 (DSM IP Assets B.V.) which is a synthetic nanoporous silica coating consisting of generally randomly arranged pores formed during a polymer curing process.

Another synthetic anti-reflective coating for photovoltaic devices is described in U.S. Pat. No. 8,153,282 B2 (Guardian Glass LLC). The anti-reflective coating comprises a graded and mixed silicon oxide, titanium oxide layer supplemented with zirconium oxide, above which an outer layer of silicon oxide having a quarter-wave thickness is provided. U.S. Pat. No. 8,153,282 B2 teaches that the anti-reflective layer should have a near portion (closer to the active layer) which has an effective index less than the far portion (further from the active layer) in order to achieve improved anti-reflective performance.

Natural anti-reflective coatings have the advantage that they may be more readily accepted by consumers due to the reduction in chemical use in their preparation. However, efficacy remains a key priority as any reflected light which does not reach the active layer is wasted, and any downstream improvements in efficacy can never recover the losses at the cover layer.

Diatoms are a type of algae which are present in both fresh water and marine environments. The diatoms comprise a frustule which has a silicon dioxide content. The frustules are a source of mesoporous silicon dioxide (silica). WO 2017/211892 A1 (Swedish Algae Factory AB) describes the use of a benthic pennate diatoms for increasing the efficiency of a solar panel due to their light trapping effect and waveguiding effect. However, in WO 2017/211892 the diatoms are proposed to perform ideally when the diatom pores act as funnels for trapping incident light. That is, with larger diameter pores guide and direct light to narrower diameter pores (WO 2017/211892 A1, page 20 lines 19-20 & FIG. 4).

As opposed to anti-reflective coatings, the light trapping and waveguiding performance of diatom frustules has been investigated in for example, Chen, X. et al. *Numerical and experimental investigation of light trapping effect of nanostructured diatom frustules*. Sci. Rep. 5, 11977; doi: 10.1038/srep11977 (2015). Chen et al. describes via simulations and experimentation that the three-layer centric diatom frustule of *Coscinodiscus* sp. can enhance the efficiency of efficiency of solar cells via direct application to the active layer. Chen et al. teaches that the light-trapping effect is independent of orientation (Chen et al., Page. 3). Chen et al does not relate to anti-reflective coatings but rather investigates the light trapping and waveguide performance of a frustule layer, where the light is trapped and guided into the active layer (see Chen et al, FIG. 5a).

Natural anti-reflective coatings having an improved anti-reflective performance for photovoltaic devices would be ideal.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a photovoltaic device comprising an anti-reflective coating on a light incident side of a transparent cover layer, the anti-reflective coating comprising a layer of diatom frustules, each of the frustules comprising two adjacent and connected porous silica layers, the first porous silica layer having a pore diameter and pore pitch defining a first layer porosity, the second porous silicon layer having a pore diameter and pore pitch defining a second layer porosity, the second layer porosity being less than the first layer porosity, the layer of diatom frustules being arranged such that the first porous silica layer is light incident with respect to the second porous silica layer.

The anti-reflective coating reduces the reflection of light from the covering layer, such that an increased portion of the light is transmitted to the active layer, through the covering layer. The anti-reflective coating is generally not a light-trapping or waveguiding coating in that it does not propagate incident light along the covering layer, or the active layer, but substantially only reduces reflection of incident light. The orientation of the two silica layers of the diatom frustule layer increases the transmission of light through the covering layer substantially compared to other orientations, and to a single diatom frustule layer comprising a single silica layer. As the anti-reflective coating is applied to the covering layer existing, installed, photovoltaic devices/modules may be coated with the anti-reflective coating. That is, the coating need not be applied to the active layer of the photovoltaic device, and thus manufacturing complexity is decreased.

In one aspect the first porous silica layer has a pore pitch and pore diameter each being less than the pore pitch and pore diameter of the second porous silica layer. As is shown in the experimental section, the porosity and orientation of the silica layers has been shown to affect the transmission or anti-reflective performance of the anti-reflective coating.

In an aspect the diatoms are pennate diatoms, that is bilaterally symmetrical diatoms, not radially symmetrical diatoms. Pennate diatoms due to their bilateral symmetry more efficiently fill the available surface area of the anti-reflective layer such that a greater portion of the coating comprises frustules.

In one aspect the first porous silica layer has a pore diameter and pore pitch both being substantially less than the wavelength of visible light, such that the first porous silica layer may be represented by an effective index layer. The pore diameter and the pore pitch being substantially less than the wavelength of visible light, the light to be received at the active layer of the photovoltaic device, enable the modelling or simulation of the first layer as an effective index layer simplifying design and testing of the anti-reflective coating.

In another aspect the second porous silica layer has a pore diameter and pore pitch such that it cannot be represented as an effective index layer. The second layer, being a non-effective index layer, has been shown to have improved broad-spectrum performance.

An anti-reflective coating is also provided.

A method of producing a photovoltaic device comprising a transparent cover layer is provided.

A method of producing a transparent cover layer for a photovoltaic device is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

In order to provide an anti-reflective coating, addressing the various needs in the art, various concepts were considered. The provision of a layer of diatom frustules to a cover layer of a photovoltaic device has previously been shown to improve performance, however, improved performance would be ideal.

The present disclosure describes an anti-reflective coating for a photovoltaic device comprising a layer of diatom frustules. The anti-reflective coating may be described itself as a layer. The diatom frustules comprise a first porous silica layer and a second porous silica layer. The first layer has a pore diameter and pore pitch both being less than the pore diameter and pore pitch of the second layer. The first layer is arranged such that it is light incident with respect to the second layer. Surprisingly, as will be evident from the experimental section, this has been shown to have a substantially increased performance with respect to other orientations.

Figure 1A:
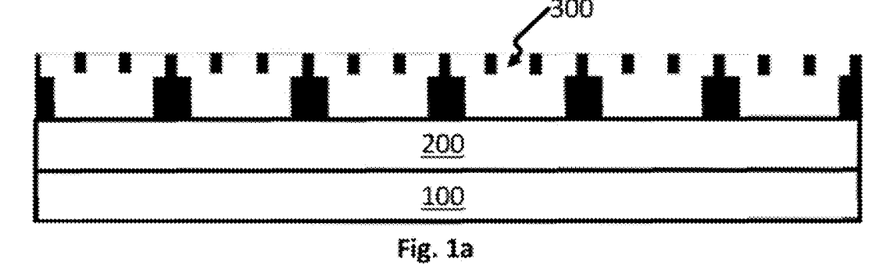
FIG. 1a is a schematic side-view diagram of a photovoltaic device comprising an anti-reflective coating according to an aspect.

As described above, a photovoltaic device comprises an active layer 100, which receives incident light and generates a charge on exposure to light. A transparent cover layer 200 is generally provided on the light-incident side of the active layer to protect the active layer from degradation due to exposure to the atmosphere, or the accumulation of debris etc. The transparent cover layer 200 may be a glass layer, a single or multi-layer film. Incident light to the photovoltaic device must pass the transparent cover layer 200 prior to entering the active layer 100.

It is known that anti-reflective coatings may be applied to the transparent cover layer 200 to reduce reflection from the transparent cover layer 200 and thereby increase the overall efficiency of the photovoltaic device.

The anti-reflective coating 300 of the present disclosure comprises a layer of diatom frustules, wherein the diatom frustules comprise two layers and wherein the first layer has a pore diameter and pore pitch being less than the pore diameter and pore pitch of the second layer.

In the present disclosure, porosity is the ratio of the pore volume to the total volume of the layer. The porosity is therefore dependent on the pore size, that is, diameter for circular or elliptical pores, and the pitch of the pores for each layer. The pitch refers to the centre-to-centre distance between individual pores in the frustule layer.

The pore diameter of the first layer is less than the pore diameter of the second layer. The pore pitch of the first layer is less than the pore pitch of the second layer. The porosity of the first layer is greater than the porosity of the second layer. That is, the second layer has larger pores, spaced further apart, than the first layer, however, the porosity of the first layer is greater than the porosity of the second layer.

The anti-reflective coating 300 is provided to at least the light-incident side of the transparent cover layer 200, such that light passes through the anti-reflective coating prior to entering the transparent cover layer 200. Such a single-layer coating is generally described as a Single Layer Anti-Reflective Coating (SLARC). The light-incident side of the transparent cover layer 200 may also be referred to as the top side of the cover layer, as it is generally the side which is arranged toward the sun, that is, on top.

In addition to coating on the light-incident side, the anti-reflective coating 300 may be provided to the opposing side of the transparent cover layer 200, that is, the underside. In such instances the combined anti-reflective coatings for a Double Layer Anti-Reflective Coating (DLARC) to the transparent cover layer 200.

A photovoltaic device may comprise layers in addition to the active layer 100 and the transparent cover layer 200. For example, the active layer 100 may be encapsulated in an Ethylene Vinyl Acetate (EVA) or Poly Vinyl Butyral (PVB) layer or layers. Other encapsulants are known in the field. As these polymer encapsulants may degrade when installed and exposed to the ambient environment and dirt etc, the transparent cover layer 200 is still provided to encapsulated active layers 100.

Figure 1B:
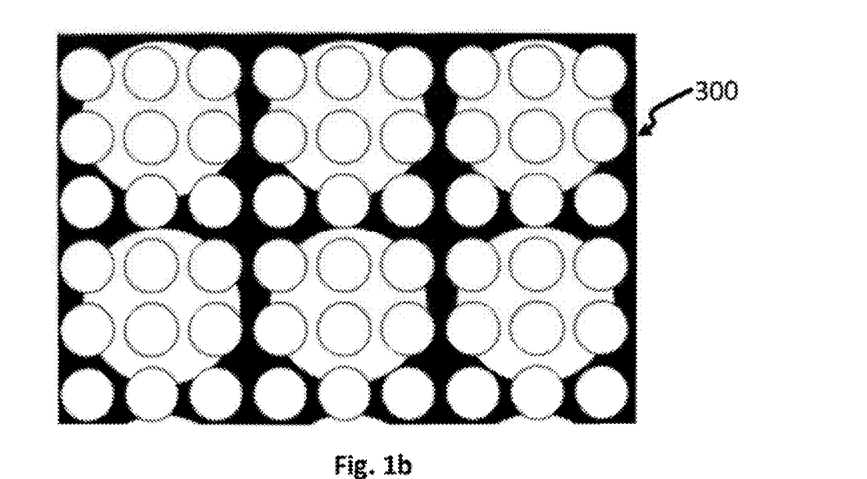
FIG. 1b is a schematic top-view diagram of an anti-reflective coating according to an aspect.

Diatom frustules may have a single layer, two layers, or several layers of porous silica. The diatom frustules having two layers as described herein have the structure as shown schematically in the cross-sectional FIG. 1*a*. FIG. 1*b* shows a top-down view where the first layer which has a greater porosity is above the second layer, the second layer having a lower porosity in comparison to the first layer. Each frustule comprises a mantle of silica having a plurality of pores. In FIG. 1, the pores are circular, however, the pores may have other shapes such as hexagonal. The pores in the first and/or the second layer may be in a square array as shown in FIG. 1. The pores in the first and/or the second layer may be in a hexagonal array. As described in experiment 1, the pores of the first layer may be in a hexagonal array and the pores of the second layer may be a square layer. A hexagonal array allows tighter packing of the pores, enabling an increased porosity.

The thickness of the first porous silica layer may be from about 10 nm to about 200 nm. Ideally, the thickness of the first pore layer is from about 20 nm to about 150 nm, such as from about 50 nm to about 100 nm. The thickness of the second porous silica layer may be from about 50 nm to about 1000 nm, such as from about 50 nm to about 500 nm, such as from about 50 nm to about 200 nm.

The diameter or pores in the first layer may be less than about 200 nm, such as less than about 100 nm, such as from about 20 nm to about 200 nm, such as from about 20 nm to about 100 nm. The diameter of pores in the first layer is substantially less than the wavelength of light to be received at the active layer of the photovoltaic device.

The pitch of pores in the first layer may be less than about 200 nm, such as from about 20 nm to about 200 nm, such as about 100 nm. The pitch of pores in the first layer is substantially less than the wavelength of light to be received at the active layer of the photovoltaic device.

As the diameter and pitch of the pores in the first layer are substantially less than the wavelengths of light which is to be received at the active layer of the photovoltaic device the first layer may be represented in simulations as an effective index layer. The first layer is therefore an optical layer with an effective index being essentially a volumetric average of the materials in the layer, generally air in the pores and silica for the structure. The wavelengths of light to be received at the photovoltaic device is generally from about 400 nm to about 1200 nm as such wavelengths provide sufficient energy to the active layer of the photovoltaic device. Typically, photovoltaic devices are designed to receive light in the visible and near-IR range.

The diameter of the pores in the second layer are substantially larger than the pores in the first layer. The pitch between pores in the second layer is substantially larger than the pitch between pores of the first layer. The diameter of pores in the second layer may be greater than about 100 nm. The diameter may be from about 100 nm to about 2000 nm, such as from about 150 nm to about 300 nm, such as from about 200 nm to about 250 nm. The pitch of pores in the second layer may be from about 200 nm to about 2000 nm, such as from about 250 nm to about 1000 nm, such as from about 250 nm to about 500 nm, such as from about 300 nm to about 350 nm. The diameter and pitch of pores in the second layer is such that the second layer is not suitable for modelling as an effective index layer. That is, the second layer cannot be modelled as an effective index layer as the pore diameter and pore pitch are not sufficiently small when compared to the wavelength of light to be received at the photovoltaic device. The second layer cannot be represented as an effective index layer in at least a portion of the visible or near-infrared light range.

In the experimental section below, the first layer may be modelled or simulated as an effective index layer as the pore diameter and pore pitch are significantly less than the wavelength of light to be received at the photovoltaic device. The second layer has pore diameters and pore pitches which are nearing the wavelength of light and therefore cannot be modelled as an effective index layer. Modelling such a layer as an effective index does not result in a valid result and therefore prior-art in which larger pore layers are modelled as an effective index layer are generally not valid guidance for the actual results to be expected.

The frustules may be extracted from cultured diatoms. The diatoms may be benthic pennate diatoms as described in WO 2017/211892 A1. An advantage of pennate diatoms is that the elongated bilaterally symmetrical frustule may enable an anti-reflective layer which comprises more frustules per area. That is, the shape may enable better filling of the available area. In some cases the diatoms may be centric diatoms. Centric diatoms are radially symmetric, generally round and therefore do not generally fill a layer as efficiently as benthic diatoms.

The anti-reflective coating 300 comprises a layer of the diatom frustules. Ideally, the anti-reflective coating may comprise a monolayer, that is a single layer, of diatom frustules as this is expected to provide the best anti-reflective effect.

The anti-reflective coating 300 may be applied directly to the transparent cover layer, or it may be applied with an intermediate agent to enable the anti-reflective layer to adhere to the transparent cover layer. The intermediate agent may be referred to as an adhesion promoting layer. The intermediate agent is ideally thin and may be therefore only a few nm thick.

The anti-reflective coating 300 comprising diatom frustules may be provided above, that is, on top of, an existing anti-reflective coating. For example, a previously applied anti-reflective coating may have been provided to a photovoltaic device, however, the layer may degrade over time, to improve the efficiency of the photovoltaic device, the anti-reflective layer comprising diatom frustules may be provided above the previously applied anti-reflective coating. In such an arrangement, the frustules may no longer be in direct contact with the transparent cover layer, but rather in direct contact with the existing anti-reflective coating.

The active layer 100 of the photovoltaic device may be any known active layer such as Poly-Si, mono-Si, IBC-Si, and CIGS.

The term transparent as used to describe the transparent cover layer 200 refers to a layer which is at least transparent to visible light. For example, the transparent cover layer 200 may be an inorganic glass such as borosilicate glass, soda lime glass, glass ceramic, aluminosilicate glass. As described above, the transparent cover layer may be a plastic such as PET, PC, TAC, PMMA, PE, PP, PVC and PS. The transparent cover layer 200 may be a composite material being, for example, a laminate. The substrate is generally a flat glass with a smooth or patterned surface.

The anti-reflective coating 300 can be applied to the substrate with various deposition techniques, known to the skilled person for making thin homogeneous coating layers. Suitable methods include spin-coating, dip-coating, spray-coating, roll-coating, slot die-coating, aerosol coating and the like. As stated above, the thickness is ideally a monolayer, however, if portions of the anti-reflective layer comprise frustules overlapping each other, thereby forming a non-monolayer then this is not expected to significantly reduce the performance of the anti-reflective coating.

Figure 2A:
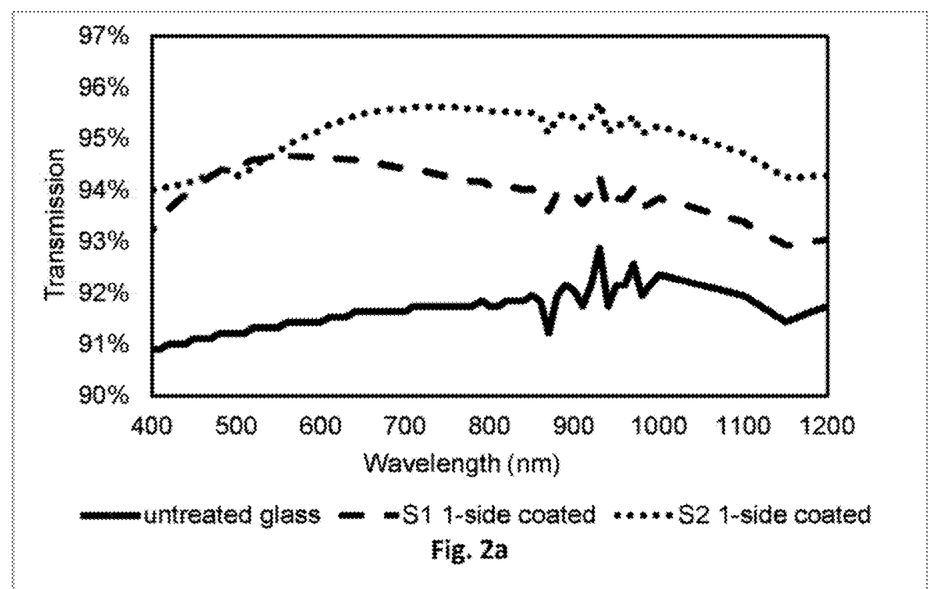
FIG. 2a show the transmission over a range of wavelengths for untreated glass, glass treated with an anti-reflective coating comprising frustules of a single layer, and glass treated with an anti-reflective coating comprising frustules comprising two layers of pores of different sizes at 0° tilt angle.

The anti-reflective coating 300 reduces the reflection of light from the surface of a substrate to which it is applied, such as the transparent cover layer 200, at one or more wavelengths. For example, as shown in the experimental section, the anti-reflective coating may reduce the reflection of incident light at wavelengths from about 400 nm to about 1200 nm. The reduction in reflection via the anti-reflective coating may be different at different wavelengths. The reduction in reflection may be determined by comparing the reflection of light at different wavelengths from an untreated substrate to a substrate coated with the anti-reflective coating as shown in FIG. 2a.

EXPERIMENTAL SECTION

Experiment 1: Modelled Transmission and Reflectivity for Untreated Glass, and Glass Coated with an Anti-Reflective Layer of Frustules of Two Species The reflectivity and transmission of untreated glass, and glass coated with frustules from species 1 (S1), or species 2 (S2) were compared via simulation. S1 comprised a single layer of pores, S2 comprised two layers of pores of different dimensions and pitch and therefore, the two layers each have a different porosity. Layer 1 of S2 had pores arranged in a hexagonal array whereas layer 2 of S2 had pores arranged in a square array. The two different frustule species were simulated according to the geometries shown below.

| Parameter | S1 | S2 (layer 1) | S2 (layer 2) |
|---|---|---|---|
| Pore pitch (nm) | 200 | 100 | 325 |
| Pore diameter (nm) | 100 | 75 | 220 |
| Layer height (nm) | 100 | 50 | 100 |
| Pore density | 20% | 51% | 36% |
| $N_{effective}$ Linear | 1.37 | 1.23 | (not applicable) |

Figure 2B:
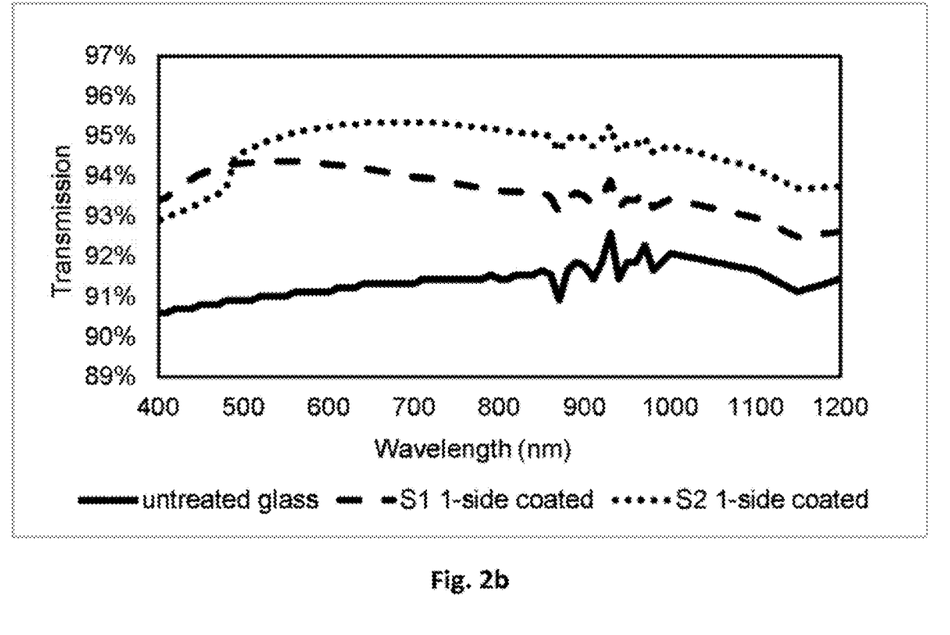
FIG. 2b show the transmission over a range of wavelengths for untreated glass, glass treated with an anti-reflective coating comprising frustules of a single layer, and glass treated with an anti-reflective coating comprising frustules comprising two layers of pores of different sizes at 30° tilt angle.
Figure 2C:
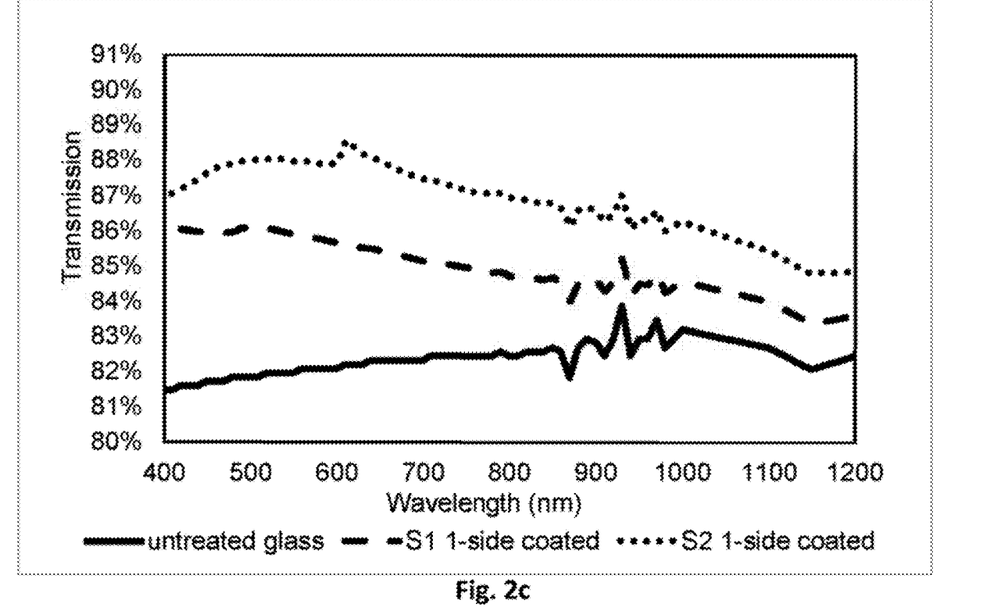
FIG. 2c shows the transmission over a range of wavelengths for untreated glass, glass treated with an anti-reflective coating comprising frustules of a single layer, and glass treated with an anti-reflective coating comprising frustules comprising two layers of pores of different sizes at 60° tilt angle.

The frustule species S1 and S2 were simulated in a program that implements the rigorous coupled-wave approximation (RCWA) to solve Maxwell's equations. The frustules were represented as infinitely large sheets of silicon oxide containing circular pores on fixed square (or occasionally hexagonal) pitch. The results for transmission of untreated glass, S1 and S2 over a range of wavelengths are shown in FIG. 2a for light at normal incidence (0°), in FIG. 2b for light at an angle of incidence of 30° and in FIG. 2c for light at an angle of incidence of 60°. In FIG. 2a-c it can be seen that both S1 and S2 had an increased transmission compared to untreated glass. In particular, S2 comprising frustules each comprising two layers, where the pore diameter and pore pitch of the first layer is less than the pore diameter and pore pitch of the second layer had an improved transmission compared to S1 over the range of wavelengths. S2 performs comparatively best at around 700 nm, which corresponds to the region of greatest efficiency for photovoltaic devices with a silicon based active layer, making it an important wavelength for photovoltaic devices.

Experiment 2: Angular Transmission Gain of an Anti-Reflective Layer Comprising Frustules of S1, S2

Figure 3A:
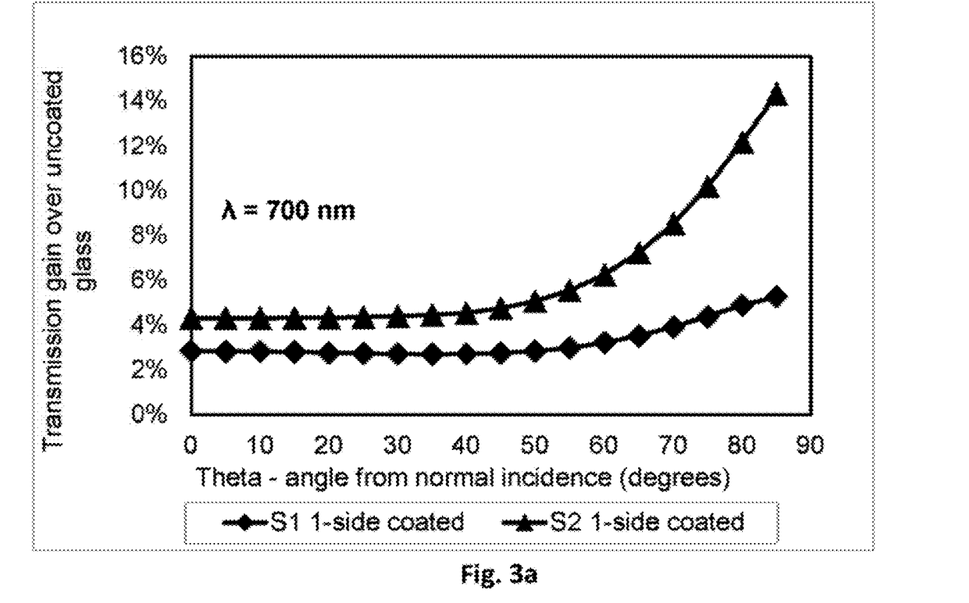
FIG. 3a shows the angular transmission gain compared to untreated glass with glass provided with an anti-reflective coating comprising frustules of a single layer, and frustules comprising two layers of pores of different sizes at 700 nm.
Figure 3B:
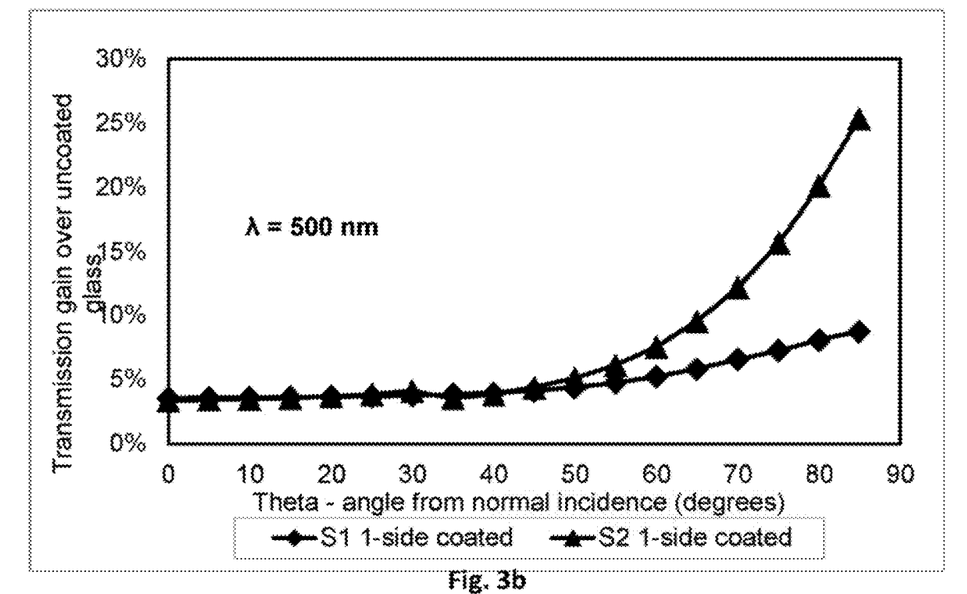
FIG. 3b shows the angular transmission gain compared to untreated glass with glass provided with an anti-reflective coating comprising frustules of a single layer, and frustules comprising two layers of pores of different sizes at 500 nm.
Figure 4A:
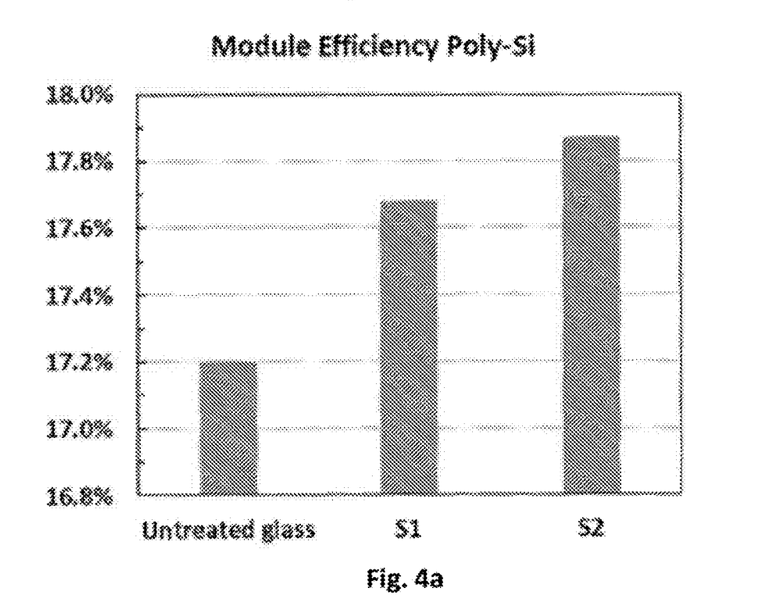
FIG. 4a shows the module efficiency for poly-Si photovoltaic devices provided with an anti-reflective coating of frustules of a single layer, and frustules comprising two layers of different pore sizes.
Figure 4B:
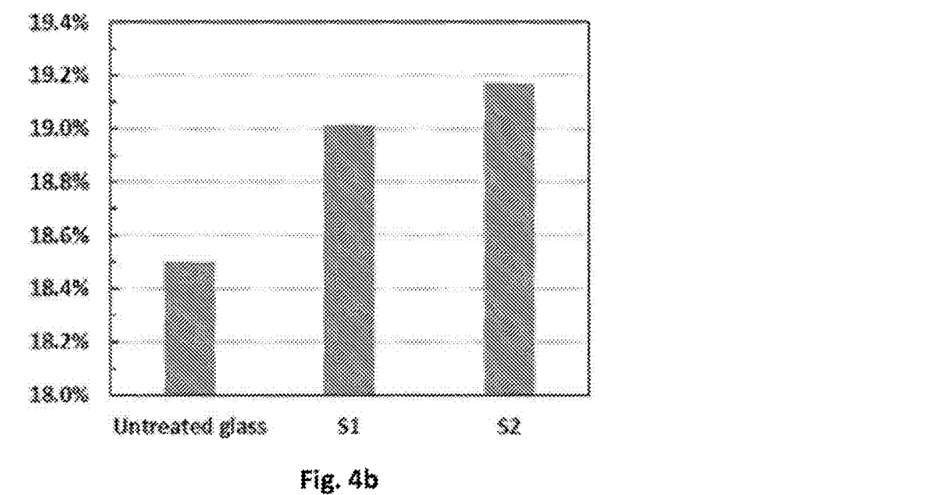
FIG. 4b shows the module efficiency for mono-Si photovoltaic devices provided with an anti-reflective coating of frustules of a single layer, and frustules comprising two layers of different pore sizes.
Figure 4C:
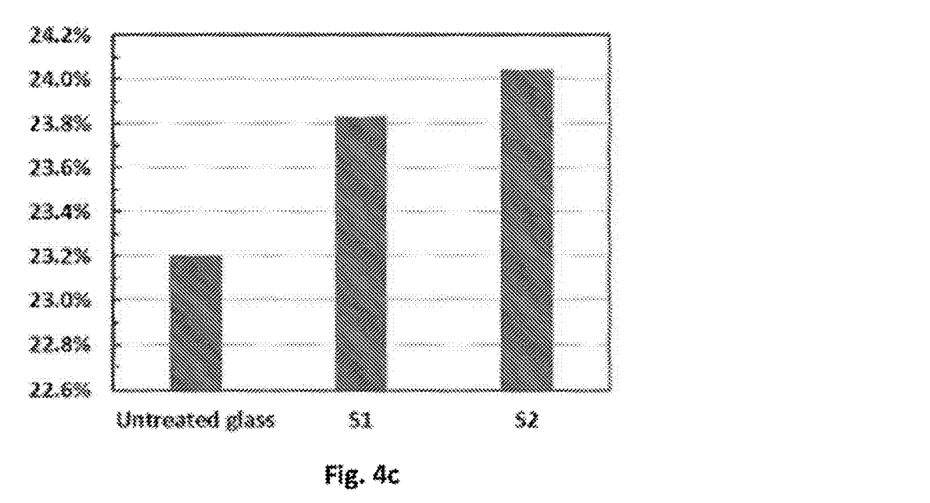
FIG. 4c shows the module efficiency for IBC-Si photovoltaic devices provided with an anti-reflective coating of frustules of a single layer, and frustules comprising two layers of different pore sizes.
Figure 4D:
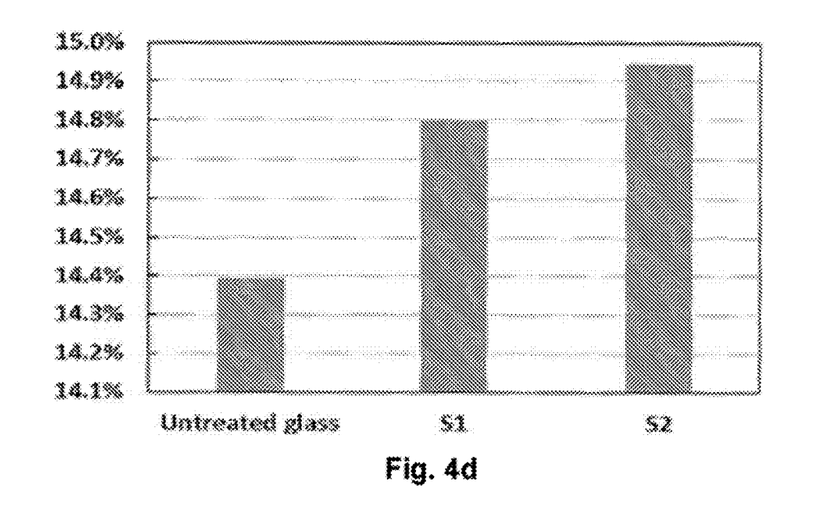
FIG. 4d shows the module efficiency for CIGS photovoltaic devices provided with an anti-reflective coating of frustules of a single layer, and frustules comprising two layers of different pore sizes.

The angular transmission gain over uncoated glass was determined for S1, S2, at 500 nm and 700 nm. The results are shown in FIGS. 3a and b. FIGS. 3a and b show that S2 has significantly improved transmission gain at tilted incident angles at both 500 nm and 700 nm. Due to the increased relative efficiency at higher tilt angles the anti-reflective coating comprising frustules of two layers (S2) is especially relevant in environments where the tilt angle will be greater than 0°. The improvement at higher tilt angles is hypothesized to be due to the two-layer silica structure of the frustule.

Experiment 3: Efficiency Improvements of Various Existing Photovoltaic Module Technologies Coated with a Cover Layer of Untreated Glass, and Glass Coated with an Anti-Reflective Layer of Frustules of Two Species The total efficiency of a solar modules (Poly-Si, Mono-Si, IBC-Si, CIGS) with a covering layer of untreated glass, with glass coated with a layer of S1 frustules, and with glass coated with a layer of S2 frustules was modelled and compared. The results are at normal (0°) incidence light. The results are shown in FIGS. 4a-d. The results show that the S2 frustule layer can improve efficiency by approximately 0.6% absolute compared to uncoated glass. The efficiency improvement of S2 frustules is consistent over a range of solar module technologies. Compared to untreated glass the frustule layer improves the efficiency by 0.5-0.8% absolute. As the results are shown for normal incidence light, and as the results in experiment 2 show that the anti-reflective coating has especially improved performance at higher tilt-angles, the actual in situ improvement in efficiency would be expected to be higher. Higher tilt angles represent diffuse light, light conditions in early morning and evening, and light during the day in e.g., autumn, winter and spring, in non-equatorial locations.

Experiment 4: Comparing Orientation of S2 Frustules in an Anti-Reflective Layer

As the S2 frustules may be arranged with either the first layer (small pore) or the second layer (large pore) being the light incident layer, i.e., the layer which receives light first, different arrangements were modelled for various porosities. The frustules were modelled according to the following parameters: the frustules were modelled with the second layer having a constant porosity of 36%, a pore diameter of 220 nm, a pore pitch of 325 nm. Both the first and second layers were assumed to be 100 nm thick. The anti-reflective layer was modelled above an infinitely thick low-iron glass layer. The effective index of the first layer may be determined based on the porosity, pore diameter and pore pitch, whilst the second layer does not respond as an effective index film and therefore the layer was modelled as above with specific and constant porosity, pore pitch and pore diameter.

| S2 (layer 1) Porosity | S2 (layer 2) Porosity | S2 (layer 1) $N_{effective}$ | S2 (layer 2) $N_{effective}$ |
|---|---|---|---|
| 70% | 36% | 1.14 | N/A |
| 50% | 36% | 1.23 | N/A |
| 20% | 36% | 1.37 | N/A |

Figure 5A:
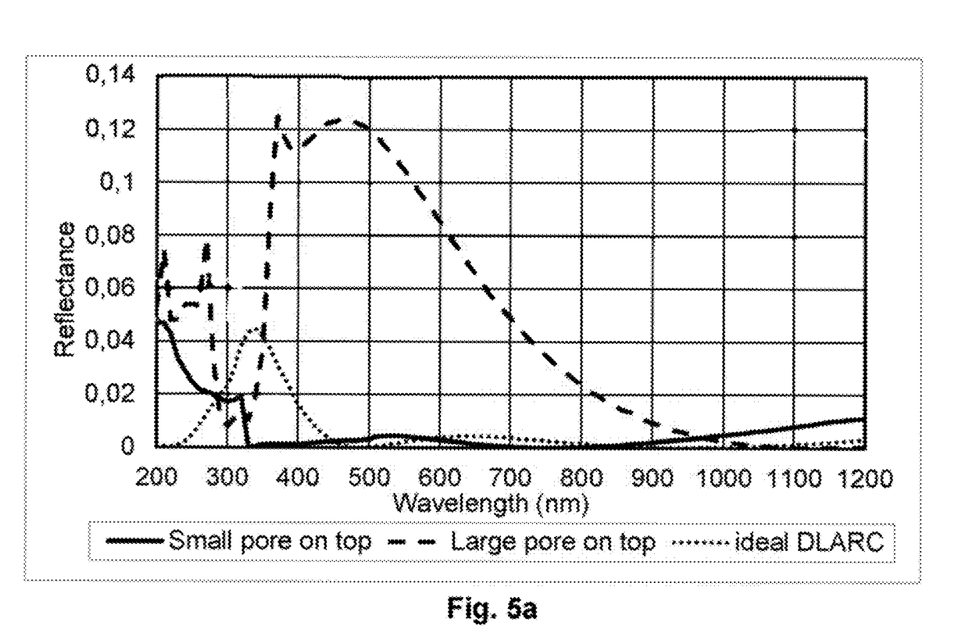
FIG. 5a shows reflectance for an ideal DLARC coating on glass, glass provided with an anti-reflective coating of two layer frustules, where the smaller pore layer has a porosity of 70%. The solid line shows the reflectance where the smaller pore layer is the light incident layer, the dashed line shows reflectance where the larger pore layer is the light incident layer.
Figure 5B:
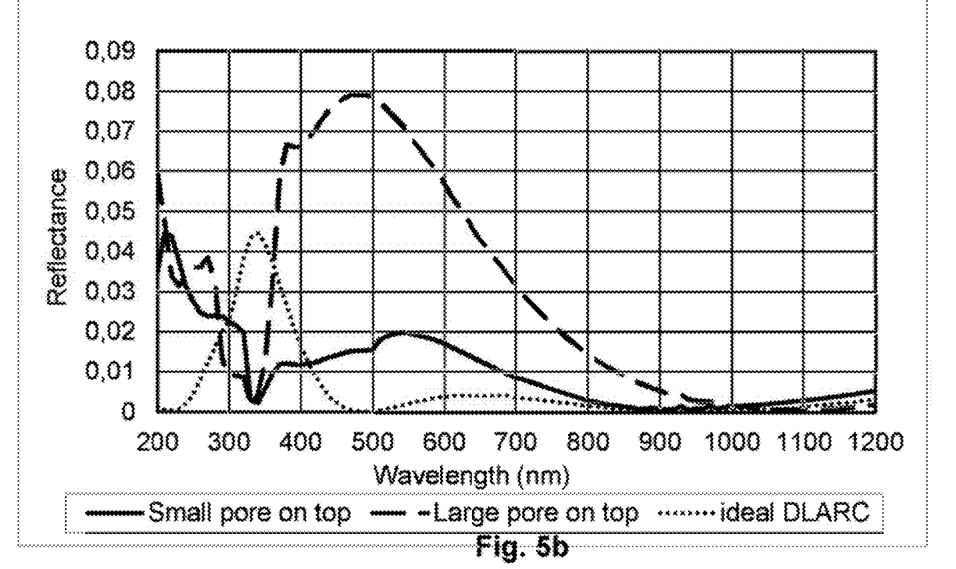
FIG. 5b shows reflectance for an ideal DLARC coating on glass, glass provided with an anti-reflective coating of two layer frustules, where the smaller pore layer has a porosity of 50%. The solid line shows the reflectance where the smaller pore layer is the light incident layer, the dashed line shows reflectance where the larger pore layer is the light incident layer.
Figure 5C:
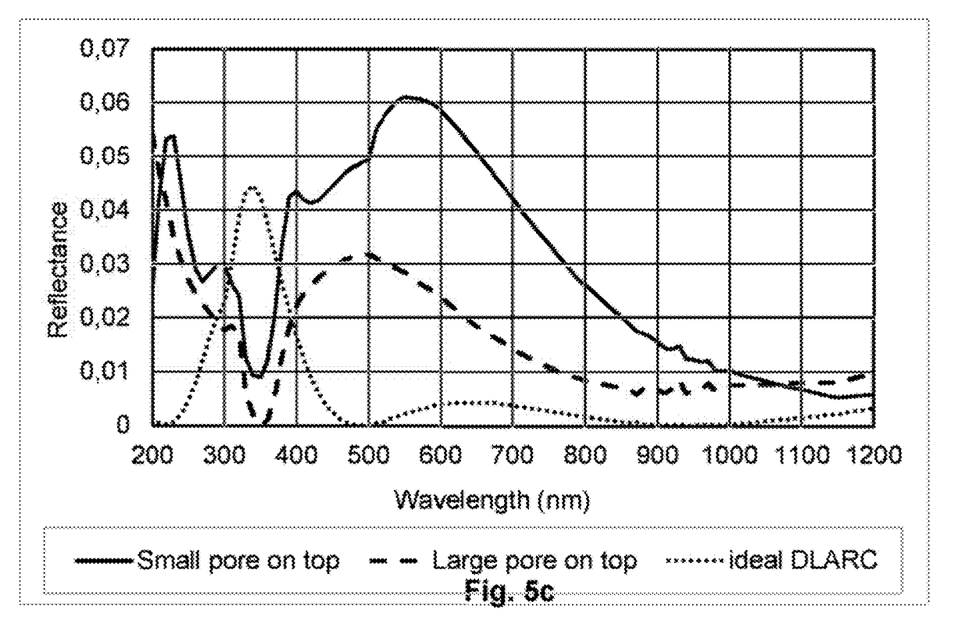
FIG. 5c shows reflectance for an ideal DLARC coating on glass, glass provided with an anti-reflective coating of two layer frustules, where the smaller pore layer has a porosity of 20%. The solid line shows the reflectance where the smaller pore layer is the light incident layer, the dashed line shows reflectance where the larger pore layer is the light incident layer.

The results are shown in FIGS. 5a-c. In FIGS. 5a-c, results are compared to a glass coated with a conventional quarter-wave optimized DLARC having a light incident 141 nm thick first layer with index 1.15 and a 122 nm second layer with index 1.33, labelled as ideal DLARC. From FIGS. 5a and b, it can be seen that for frustules where the light incident layer has each of smaller pores, a reduced pitch, and greater porosity with respect to the second layer, the anti-reflective performance is improved. FIG. 5c shows that the effect is dependent on at least the porosity of the small pore layer, as when the porosity of the small pore, light incident layer, is 20% then the effect is not present and the reflectance is increased, leading to decreased transmission.

That the orientation of the frustules is important and can affect the efficiency of the anti-reflective coating is surprising, as previous research (Chen et al, 2015) has suggested that orientation is generally not important. Furthermore, previous literature has suggested that orienting the larger pores to be the light incident layer is ideal as it generates a light-trapping effect. The present inventors have surprisingly found this not to be the case.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A photovoltaic device comprising an anti-reflective coating on a light incident side of a transparent cover layer, the anti-reflective coating comprising a layer of diatom frustules, each of the frustules comprising two adjacent and connected porous silica layers,
    the first porous silica layer having a pore diameter and pore pitch defining a first layer porosity, the second porous silicon layer having a pore diameter and pore pitch defining a second layer porosity, the second layer porosity being less than the first layer porosity, wherein the pore pitch and pore diameter of the first porous silica layer are each less than the pore pitch and pore diameter of the second porous silica layer,
    the layer of diatom frustules being arranged such that the first porous silica layer is light incident with respect to the second porous silica layer.

2. The photovoltaic device according to claim 1, wherein the diatoms are pennate diatoms.

3. The photovoltaic device according to claim 1, wherein the pore pitch and pore diameter of the first porous silica layer are each substantially less than the wavelength range of visible light, such that the first porous silica layer may be represented by an effective index layer.

4. The photovoltaic device according to claim 1, wherein the pore pitch and pore diameter of the second porous silica layer are such that the second porous silica layer it cannot be represented as an effective index layer.

5. The photovoltaic device according to claim 1, wherein the frustules consist of the two adjacent and connected porous layers.

6. The photovoltaic device according to claim 1, wherein the second porous silica layer has a thickness of from about 50 nm to about 500 nm.

7. The photovoltaic device according to claim 1, wherein the porosity of the first porous silica layer is greater than about 20%.

8. The photovoltaic device according to claim 1, wherein the pitch of pores in the first porous silica layer is less than about 200 nm.

9. The photovoltaic device according to claim 1, wherein the diameter of pores in the first porous silica layer is less than about 200 nm.

10. An anti-reflective coating for a photovoltaic device, the anti-reflective coating comprising a layer of diatom frustules, each of the frustules comprising two adjacent and connected porous silica layers,
    the first porous silica layer having a pore diameter and pore pitch defining a first porosity,
    the second porous silicon layer having a pore diameter and pore pitch defining a second porosity, the second porosity being less than the first porosity, wherein the pore pitch and pore diameter of the first porous silica layer are each less than the pore pitch and pore diameter of the second porous silica layer, the layer of diatom frustules being arranged such that the first porous silica layer is the light incident layer of the anti-reflective coating.

11. The anti-reflective coating according to claim 10, wherein the pore pitch and pore diameter of the first porous silica layer are each substantially less than the wavelength of visible light such that the first porous silica layer may be represented as a light effective index layer.

12. The anti-reflective coating according to claim 10, wherein the diatoms are pennate diatoms.

13. The anti-reflective coating according to claim 10, wherein the frustules consist of the two adjacent and connected porous layers.

14. The anti-reflective coating according to claim 10, wherein the second porous silica layer has a thickness of from about 50 nm to about 500 nm.

15. A method for producing a photovoltaic device comprising a transparent cover layer comprising:

providing the anti-reflective coating according to claim 10 to the light incident side of the transparent cover layer.

* * * * *